(12) United States Patent
Rodriguez (10) Patent No.: US 11,288,894 B2
(45) Date of Patent: Mar. 29, 2022

(54) IMAGE OPTIMIZATION DURING FACIAL RECOGNITION

(71) Applicant: Google LLC, Mountain View, CA (US)

(72) Inventor: Uriel Gerardo Rodriguez, New York, NY (US)

(73) Assignee: Google LLC, Mountian View, CA (US)

( * ) Notice: Subject to any disclaimer, the term of this patent is extended or adjusted under 35 U.S.C. 154(b) by 147 days.

(21) Appl. No.: 16/582,047

(22) Filed: Sep. 25, 2019

(65) Prior Publication Data

US 2020/0019757 A1    Jan. 16, 2020

Related U.S. Application Data

(60) Continuation of application No. 16/203,272, filed on Nov. 28, 2018, now Pat. No. 10,762,332, which is a
(Continued)

(51) Int. Cl.
*G06K 9/00* (2022.01)
*G06V 40/16* (2022.01)
(Continued)

(52) U.S. Cl.
CPC .............. *G06V 40/166* (2022.01); *G06T 5/00* (2013.01); *G06T 7/60* (2013.01); *G06T 7/73* (2017.01);
(Continued)

(58) Field of Classification Search
CPC .... G06T 7/73; G06T 5/00; G06T 7/60; G06T 2207/30201; G96T 2207/30201;
(Continued)

(56) References Cited

U.S. PATENT DOCUMENTS 4,561,752 A * 12/1985 Miyamoto ......... G03B 7/09979
396/234
4,912,495 A *  3/1990 Ishikawa ................ G03B 7/091
396/233
(Continued)

FOREIGN PATENT DOCUMENTS

KR    1020080085729 A  *  9/2008

OTHER PUBLICATIONS

Exposure correction for imaging devices—overview. Battiato et al., Aug. 13, 2012, pp. 1-33 (Year: 2012).*
(Continued)

*Primary Examiner* — Jayesh A Patel
(74) *Attorney, Agent, or Firm* — McDonnell Boehnen Hulbert & Berghoff LLP (57) ABSTRACT

Described is a technique for optimization an image for facial detection. More specifically, described is a process of predicting the location of a face within an image and adjusting image settings based on at least a portion of the predicted location of the face. An image may be adjusted based on the characteristics of a metering region, which may be selected prior to performing facial detection. For example, the metering region may be a specified shape with dimensions equal to a certain percentage of the input image and placed at a specified location. The result of using such a metering region is that the image adjustments may be based on a portion of the face, and therefore, may be optimized for facial detection.

20 Claims, 6 Drawing Sheets

Related U.S. Application Data continuation of application No. 15/014,222, filed on Feb. 3, 2016, now Pat. No. 10,169,643, which is a division of application No. 13/655,817, filed on Oct. 19, 2012, now Pat. No. 92,866,509.

(51) Int. Cl.
| | |
|---|---|
| *H04N 5/232* | (2006.01) |
| *H04N 5/235* | (2006.01) |
| *G06T 7/73* | (2017.01) |
| *G06V 10/60* | (2022.01) |
| *G06T 5/00* | (2006.01) |
| *G06T 7/60* | (2017.01) |
| *H04N 7/18* | (2006.01) |
| *G06V 10/46* | (2022.01) |

(52) U.S. Cl.
CPC ............ *G06V 10/60* (2022.01); *G06V 40/172* (2022.01); *H04N 5/2351* (2013.01); *H04N 5/2353* (2013.01); *H04N 5/23219* (2013.01); *H04N 5/23293* (2013.01); *H04N 7/18* (2013.01); *G06T 2207/30201* (2013.01); *G06V 10/467* (2022.01)

(58) Field of Classification Search
CPC .... G06V 40/166; G06V 10/60; G06V 40/172; G06V 10/467; H04N 5/23219; H04N 5/23293; H04N 5/2351; H04N 5/2353; H04N 7/18
See application file for complete search history.

(56) References Cited

U.S. PATENT DOCUMENTS

| | | | | | |
|---|---|---|---|---|---|
| 4,929,824 | A | * | 5/1990 | Miyazaki | G01J 1/4209 250/208.1 |
| 4,937,611 | A | * | 6/1990 | Miyazaki | G03B 7/09976 250/208.6 |
| 5,012,522 | A | * | 4/1991 | Lambert | A61B 5/1176 382/118 |
| 5,023,649 | A | * | 6/1991 | Hayashi | G03B 7/09979 396/234 |
| 5,146,258 | A | * | 9/1992 | Bell | G03B 7/09979 250/208.6 |
| 5,392,091 | A | * | 2/1995 | Iwasaki | G03B 13/02 396/234 |
| 6,081,669 | A | * | 6/2000 | Kosako | G03B 7/097 396/233 |
| 7,315,631 | B1 | | 1/2008 | Corcoran et al. | |
| 7,551,223 | B2 | * | 6/2009 | Tanaka | H04N 5/232945 348/346 |
| 7,573,505 | B2 | * | 8/2009 | Kawaguchi | H04N 5/232945 348/222.1 |
| 7,646,405 | B2 | * | 1/2010 | Nakami | H04N 1/4072 348/222.1 |
| 7,663,476 | B2 | * | 2/2010 | Watanabe | H04N 7/181 340/435 |
| 8,072,505 | B2 | * | 12/2011 | Sugita | H04N 5/23245 348/222.1 |
| 8,073,207 | B2 | * | 12/2011 | Ayaki | H04N 5/232123 382/118 |
| 8,213,737 | B2 | | 7/2012 | Steinberg et al. | |
| 8,233,789 | B2 | * | 7/2012 | Brunner | H04N 5/23219 396/213 |
| 8,325,890 | B2 | * | 12/2012 | Price | H04N 5/243 379/93.21 |
| 9,286,509 | B1 | * | 3/2016 | Rodriguez | H04N 5/2353 |
| 10,169,643 | B1 | * | 1/2019 | Rodriguez | H04N 5/23293 |
| 10,762,332 | B2 | * | 9/2020 | Rodriguez | G06T 7/73 |
| 2002/0008771 | A1 | * | 1/2002 | Uchino | H04N 1/6083 348/362 |
| 2002/0015514 | A1 | * | 2/2002 | Kinjo | G06V 40/16 382/118 |
| 2002/0111773 | A1 | | 8/2002 | Feola et al. | |
| 2002/0118287 | A1 | * | 8/2002 | Grosvenor | G06T 13/80 348/222.1 |
| 2003/0071908 | A1 | * | 4/2003 | Sannoh | H04N 5/23218 348/345 |
| 2004/0227826 | A1 | * | 11/2004 | Wu | H04N 5/2353 348/239 |
| 2005/0275747 | A1 | * | 12/2005 | Nayar | H04N 5/2351 348/362 |
| 2006/0012702 | A1 | * | 1/2006 | Kawahara | H04N 5/23218 348/345 |
| 2006/0077264 | A1 | * | 4/2006 | Ikeda | H04N 5/23219 348/222.1 |
| 2006/0262211 | A1 | * | 11/2006 | Kido | H04N 5/23245 348/308 |
| 2007/0073275 | A1 | | 3/2007 | Conston et al. | |
| 2007/0086761 | A1 | * | 4/2007 | Okamoto | G03B 7/097 396/14 |
| 2007/0196097 | A1 | * | 8/2007 | Sugimoto | G03B 7/08 396/234 |
| 2007/0263090 | A1 | | 11/2007 | Abe | |
| 2008/0199172 | A1 | * | 8/2008 | Hamada | G03B 7/17 396/157 |
| 2008/0225136 | A1 | * | 9/2008 | Yamada | H04N 5/2351 348/229.1 |
| 2008/0297617 | A1 | * | 12/2008 | Jeong | H04N 5/232945 348/222.1 |
| 2008/0309788 | A1 | * | 12/2008 | Onozawa | H04N 5/23219 348/222.1 |
| 2009/0080715 | A1 | | 3/2009 | van Beek et al. | |
| 2009/0231468 | A1 | | 9/2009 | Yasuda et al. | |
| 2010/0002093 | A1 | | 1/2010 | Arai et al. | |
| 2010/0020220 | A1 | * | 1/2010 | Sugita | H04N 5/23219 348/333.01 |
| 2010/0020222 | A1 | * | 1/2010 | Jones | H04N 5/2353 348/333.02 |
| 2010/0302393 | A1 | * | 12/2010 | Olsson | H04N 5/232933 348/222.1 |
| 2011/0141344 | A1 | * | 6/2011 | Abe | H04N 5/23296 348/345 |
| 2011/0249961 | A1 | | 10/2011 | Brunner et al. | |
| 2011/0298886 | A1 | * | 12/2011 | Price | H04N 5/243 348/14.08 |
| 2012/0288166 | A1 | * | 11/2012 | Sun | G06T 7/74 382/118 |
| 2012/0320181 | A1 | * | 12/2012 | Hong | H04N 1/4433 348/78 |
| 2013/0002884 | A1 | * | 1/2013 | Nakagawara | H04N 5/232127 348/169 |
| 2013/0250106 | A1 | | 9/2013 | Chang et al. | |
| 2014/0063320 | A1 | * | 3/2014 | Lin | H04N 1/3871 348/333.11 |

OTHER PUBLICATIONS

Robust Brightness Measurement and Exposure Control in Real-Time Video Recording, Wen-Chung kao et al., IEEE, 0018-9456, 2010, pp. 1206-1216 (Year: 2010).*

Battiato et al., "Exposure correction for imaging devices—overview," Aug. 13, 2012, pp. 1-33.

Chan et al., "A unified framework for capturing facial images in video surveillance system using cooperative camera system," The Chinese University of Hong Kong, Shatin, Hong Kong, Department of Computer Science and Engineering, 2008, pp. 1-12.

Cotton, Dale, "Existing light exposure metering," Version 2.1, Jul. 25, 2008, pp. 1-6.

* cited by examiner

IMAGE OPTIMIZATION DURING FACIAL RECOGNITION

CROSS REFERENCE TO RELATED APPLICATION

This application is a continuation of co-pending U.S. patent application Ser. No. 16/203,272, filed Nov. 28, 2018, which is a continuation of U.S. patent application Ser. No. 15/014,222, filed Feb. 3, 2016, which is a divisional of U.S. patent application Ser. No. 13/655,817, filed Oct. 19, 2012, all of which are incorporated by reference herein in their entirety and for all purposes.

BACKGROUND

Devices with a built-in camera may have the ability to authenticate a user by performing facial recognition. Facial recognition methods often process an image in two steps. The first step, which may be described as detection, locates a face within an image. The second step, which may be described as recognition, analyzes the detected face to determine a similarity between the detected face and a stored face or template. To achieve accurate results, the facial recognition processes may depend upon the quality of detected images. When capturing images, a camera may automatically adjust capture settings based on image characteristics. These settings may include automatic adjustments to exposure and/or gain. For example, when an image condition includes a face with strong backlighting, the automatic adjustment may reduce exposure in the image to account for the backlighting. These image settings, however, may be optimized for capturing the most visually appealing pictures.

SUMMARY

In an implementation, described is a method of optimizing a captured image for facial detection. In response to receiving an indication to perform facial detection, a metering region within a portion of the captured image may be selected. The metering region may be based on an expected location of a face and may be selected prior to detecting a face within the image. The image may be adjusted based on the metering region and a face may be detected within the adjusted image. The image may be optimized by adjusting an exposure, and/or another setting including an automatic gain control (AGC), contrast, saturation, and the like.

In an implementation, a captured image may be optimized based on a predefined and static metering region. The metering region may be described based on a size. The size of the metering region may be described as being within a percentage range of the image. The metering region may also be described based on a relative location within the image. For example, the metering region may be centered, within a specified portion of the image, or include at least two quadrants of the image.

In an implementation, described is a facial detection method including executing a facial detection algorithm on a captured image a first time and determining that a face is not detected within the image. A metering region within a portion of the image may be selected and the image may be adjusted based on the metering region. The facial detection algorithm may execute on the adjusted image a second time and may detect a face. The first execution may be based on a metering region of the entire image and the second execution may be based on a metering region optimized for facial detection.

In an implementation, described is a device for optimizing an image for facial detection. The device may include a camera for capturing the image, a display previewing the captured image, and a processor for adjusting the captured image based on a metering region within a portion of the image. The processor may adjust the camera based on a metering region and a face may be detected based on the adjusted image. A preview of the captured image may be displayed and the metering region may be based on a positioning guide displayed on the previewed image. The display may be a touch sensitive display and the metering region may be based on a user input touching a portion of the previewed image.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of implementations of the disclosed subject matter. No attempt is made to show structural details in more detail than may be necessary for a fundamental understanding of the disclosed subject matter and various ways in which it may be practiced.

DETAILED DESCRIPTION

Described is a process of improving facial detection in an image by adjusting image settings. Implementations describe adjusting the image settings based on a metering region that optimizes the image for detecting a face. The metering region may use a relevant subset of the image and may be based on an expected location of at least a portion of a face within the image. By positioning the metering region in an expected location of a face, the metering region may be selected prior to actually detecting a face.

Figure 1:
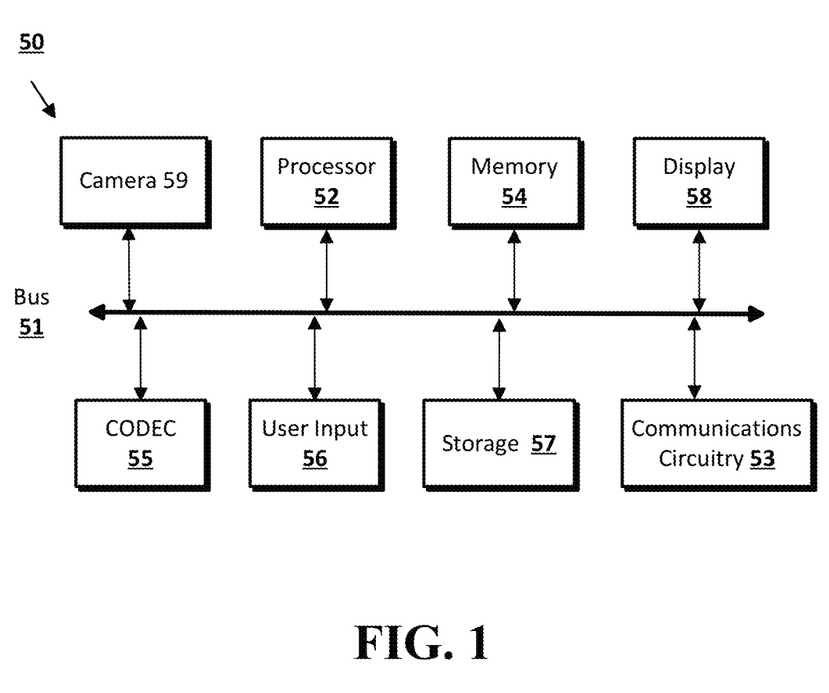
FIG. 1 shows a simplified functional block diagram of a representative device according to an implementation of the disclosed subject matter.

FIG. 1 shows a simplified functional block diagram of a representative device according to an implementation of the disclosed subject matter. The device 50 may include a bus 51, processor 52, memory 54, user input 56, display 58, memory 54, communications circuitry 53, storage 57, coder/decoder (CODEC) 55, and a camera 59.

The device 50 may include or be part of a variety of types of devices, such as a mobile phone (including a "smartphone"), tablet computer, netbook, laptop, desktop, personal digital assistant ("PDA"), set-top box, television, and/or watch, among others. The processor 52 may be any suitable programmable control device and may control the operation of one or more processes, such as the facial detection process as discussed herein, as well as other processes performed by the device 50.

The memory 54 may include one or more different types of memory which may be used for performing device functions. For example, the memory 54 may include cache, ROM, and/or RAM. The bus 51 may provide a data transfer path for transferring between components of the device 50. The CODEC 55 may be included to process digital and analog audio and/or video signals to produce sound, voice, and multimedia. The display 58 may provide visual output and may include a touch-sensitive screen.

The storage 57 may store multimedia (e.g. video, music, and photos, etc.), software (e.g., for implementing various functions on device 50), and any other suitable data. The storage 57 may include a storage medium, such as a hard-drive, solid state drive, flash drive, and the like. The storage 57 may be integral with the device 50 or may be separate and accessed through an interface to receive a memory card, USB drive, optical disk, and the like.

The user input 56 may allow a user to interact with the device 50. For example, the user input 56 may include buttons, a keypad, a touch screen, and the like. The communications circuitry 53 may include circuitry for wireless communications for short-range and/or long range communication. For example, the wireless communication circuitry may include Wi-Fi enabling circuitry for one of the 802.11 standards, and circuitry for other wireless network protocols including Bluetooth, the Global System for Mobile Communications (GSM), and code division multiple access (CDMA) based wireless protocols. Communications circuitry 53 may also include circuitry that enables the device 50 to be electrically coupled to another device (e.g. a computer or an accessory device) and communicate with that other device.

The camera 59 enables the device 50 to capture still images, video, or both. The camera 59 may capture an image or series of images continuously, periodically, at select times, and/or under select conditions. The camera 59 may be part of or coupled to one or both a front-facing camera or rear-facing camera of the device 50.

The device 50 may be battery-operated and portable so as to allow a user to communicate with others, listen to music, play games or video, record video or take pictures, or control other devices. The device 50 may be relatively compact which enables a user to easily manipulate the device's position, orientation, and movement. Accordingly, the device 50 may provide techniques of sensing such changes in position, orientation, and movement to enable a user to interface with or control the device 50 by affecting such changes. Further, the device 50 may include a vibration source, under the control of processor 52, for example, to facilitate sending motion, vibration, and/or movement information to a user related to an operation of the device 50. Other devices or components may be part of or connected to the device 50, and conversely, all of the components shown in FIG. 1 need not be present to practice the present disclosure.

Figure 2:
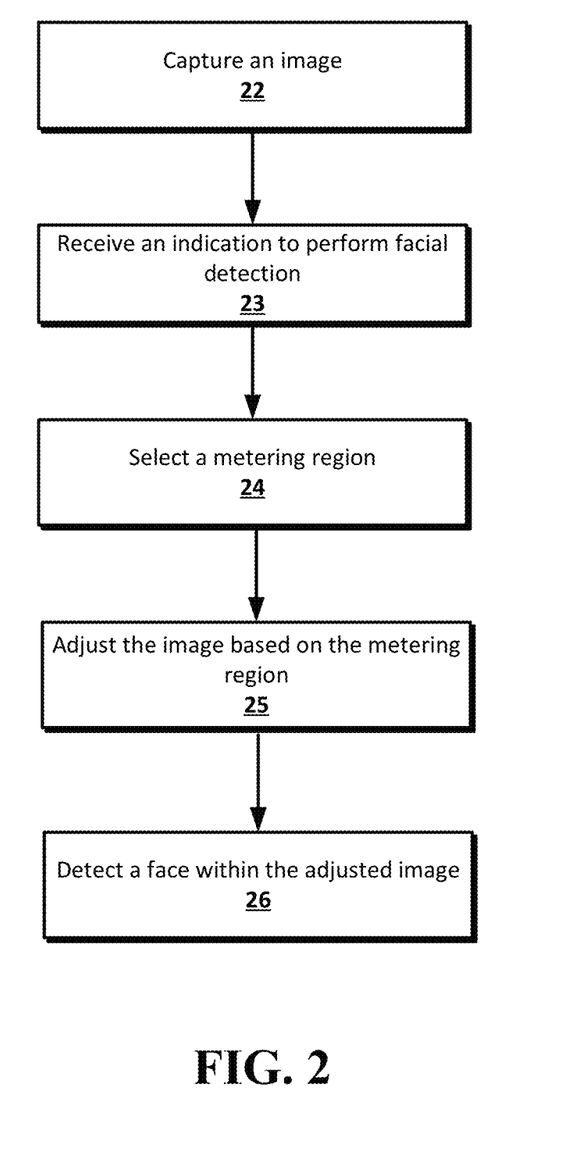
FIG. 2 shows a flow diagram of optimizing an image for facial detection according to an implementation of the disclosed subject matter.

FIG. 2 shows a flow diagram of optimizing an image for facial detection according to an implementation of the disclosed subject matter. In step 22, the device 50 may capture an image with a camera 59. Typically, the captured image may be a live image that dynamically and continuously captures an image within a field of view of the camera 59 in real-time. The captured image may also include a still image or single frame, for example, when a snapshot or picture is taken. In addition, the captured image may also include a retrieved image that may be stored on the device 50. A preview of the captured image may be shown on a display 58 in real-time or upon retrieval. Image capture may be initiated automatically, for example, upon a request to perform facial detection and/or recognition, or it may be initiated manually by a user. The image capture may occur prior to or after receiving an indication to perform facial recognition.

In step 23, the device 50 may receive an indication to perform facial detection. The indication for facial detection may be explicit or implicit. An explicit request to perform facial detection may include a user selecting a facial detection setting on the device 50 for image capture. This selection may be made in real-time, for example, while capturing a live image, or prior to capturing an image such as setting an image capture preference (e.g. facial detection mode). The explicit indication may also include a request to perform an image adjustment for facial detection and/or recognition on a stored image (e.g. a picture). An implicit indication may include initiating or requesting a process that includes facial detection as a sub-process or step. For example, a facial recognition process may include performing an initial or concurrent step of facial detection. The device 50 may have an access control feature that authenticates a user of the device by performing facial recognition. Accordingly, the indication may include various forms of a request for user authentication. Facial recognition as a form of authentication may be common for many applications in handheld devices. Facial recognition is particularly convenient for devices with a front-facing camera because they may efficiently perform facial recognition when a user is located in a position to view a display 58. The request for authentication may be automatic or may be initiated manually by the user. For example, the authentication request may occur upon a request to "unlock" the device from a "locked" state. This may occur automatically, for example, when the device 50 "awakens" from a powered-down or "sleep" state, or it may occur manually, for example, by direct user input. The device 50 may include controlling user access at an application level. Accordingly, another example of direct user input may include launching an access controlled application to initiate an authentication request.

In step 24, a metering region may be selected. The selection may be in response to the indication to perform facial recognition. The response may include an immediate response, or it may include a deferred response that may occur during the detection process. For example, upon receiving an indication that a facial detection process has been initiated, the device 50 may first activate the camera 59. Accordingly, the selection of the metering region may be deferred until the camera 59 is activated and initiates image capture. The selection of a metering region may occur without, or prior to, detecting a face within an image. Conventional facial recognition programs typically perform facial detection first, and then optimize the image based on image characteristics of the detected face. Facial detection methods may include detecting a face based on a shape, skin color, relative positioning of facial features, etc. In certain circumstances, however, the facial detection may not be possible. For example, when capturing images, a camera may automatically adjust capture settings based on characteristics of the entire image. For example, these settings may include automatic adjustments to exposure or other images settings. These image settings may be optimized for capturing the most visually appearing pictures. At this stage, these adjustments may not be optimized for facial detection because a face has not been detected yet. For example, when an image condition includes a face with strong backlighting, the automatic adjustment may reduce exposure in the image to account for the backlighting. This adjustment may alter the image to a point where there is insufficient contrast in the region of the face. As a result, the device 50 may not be able to perform facial detection.

Implementations of the disclosed subject matter may optimize an image without the requirement to perform facial detection. More specifically, implementations may select a metering region by predicting an expected location of a face. Accordingly, the metering region may provide characteristics of a portion face and not the entire image. For example, implementations may predefine the metering region to include a central region of a captured image. A user capturing an image of their face is likely to place their face within the center or close to the center of a field of view of a camera 59. Accordingly, there may be a high likelihood that the metering region may include at least a portion of the user's face, and as a result, the image may be adjusted according to a more relevant subset of the image for facial detection. Thus, the image may be optimized without, or prior to, performing facial detection.

The metering region may be described relative to the captured image. The captured image may be described in various manners including a coordinate space, quadrants, pixels values based on a resolution, zones, and the like. For example, using a coordinate space, the lower left most point of the image may have a value of −1000, −1000, and the upper right most point may have a value of 1000, 1000. Accordingly, a center point of the image would be 0, 0. A coordinate space may also be based on resolution. For example, a 1280×800 resolution screen may have 1, 1 (or 0, 0) as the lower left most point and 1280, 800 as the upper right most point. A metering region may be defined by its size, position, behavior and other characteristics. The metering region may be described in terms of a percentage size of the image and a relative position. For example, the metering region may be centered within the image and have a size of 20% of the image. In some cases, the metering region may be described as being within a portion of the image. A portion of the image is defined as an area less than the entire image. For example, a metering region may be within a central portion of the image. A central portion is defined as a rectangular shape centered at the center point of the image and may have a specified size. For example, using a coordinate space as described above, a central portion with a size of 50% of the image may have a coordinate definition of −500, −500 as the lower left most point and 500, 500 as the upper right most point of the rectangle. A metering region within this central portion may include the entire central portion or may have a smaller area. A metering region within a portion of an image may not necessarily be rectangular in shape and may not necessarily be centered at the center point of the portion of the image.

Figure 4:
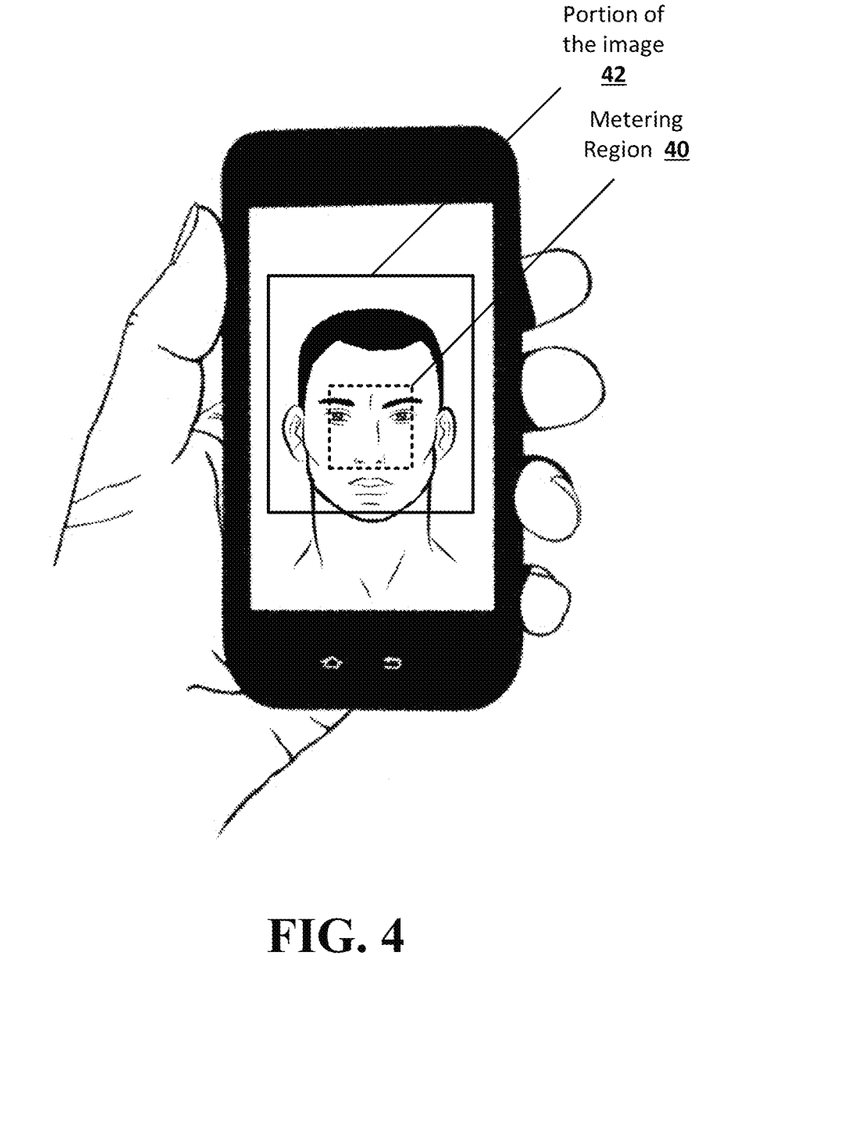
FIG. 4 shows an example of a metering region within a central portion of the image according to an implementation of the disclosed subject matter.

FIG. 4 shows an example of a metering region within a central portion of the image according to an implementation of the disclosed subject matter. As shown, metering region 40 may be within a portion of the image 42. In this example, the portion of the image 42 may be described as a central portion. As shown, the portion 42 is centered at a center point (not shown) of the image. As with this example, although the metering region 40 is within a central portion of the image, it may not be centered at the center point of the image. This offset may account for any bias that may occur. For example, a user may have a tendency to position their face lower within the field of view of a camera 59.

The position of the metering region may also be described with respect to quadrants. For example, if a metering region is centered within the image, it may include a portion of all four quadrants. If the metering region is centered only horizontally or vertically, it may only include a portion of a minimum of two quadrants.

Figure 5:
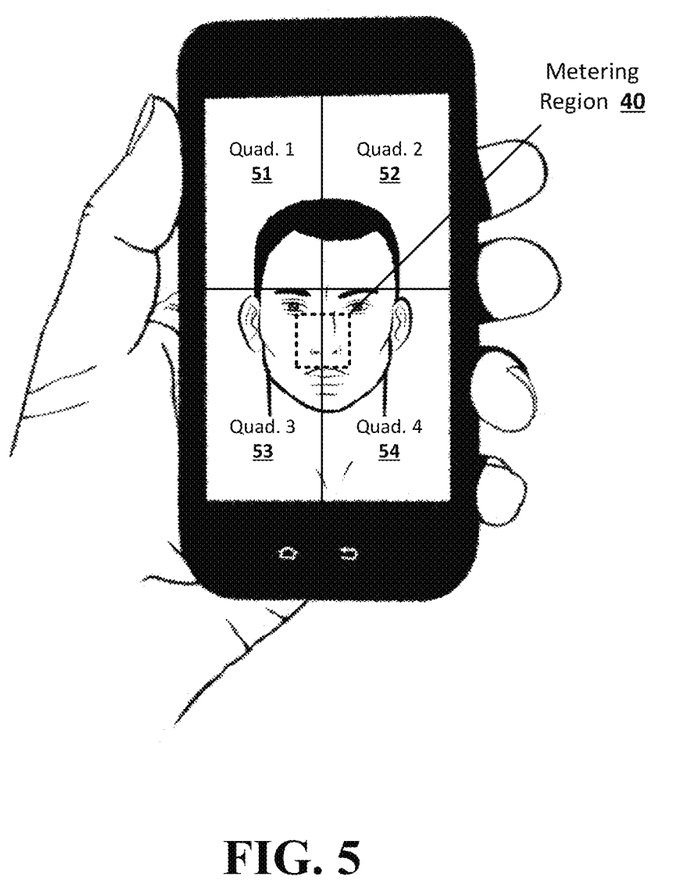
FIG. 5 shows an example of a metering region including two quadrants of the image according to an implementation of the disclosed subject matter.

FIG. 5 shows an example of a metering region including two quadrants of the image according to an implementation of the disclosed subject matter. As shown, the image may be divided in four equal quadrants, starting from the upper left most quadrant as quadrant 1 51, and clockwise to quadrant 2 52, quadrant 3 53, and quadrant 4 54. As shown, the metering region may include one or more quadrants. In this example, the metering region is centered horizontally within the image, and in this instance, includes a portion of two quadrants (quadrant 3 53 and quadrant 4 54).

Typically, a metering region may be defined as a set of coordinates at a programming level. It should be noted that the above methods of describing the location of the metering region and describing the organization of the image may not be explicitly defined at a programming level. A person of ordinary skill in the art, however, would understand such descriptions and select a set of coordinates accordingly. For example, a description of a metering region with a size of 20% of the image and within a central portion with a 50% size of the image, would enable a person of ordinary skill in the art to understand that the region may be defined with a set of coordinates that need only be within the −500, −500 and 500, 500 rectangular boundary in the coordinate space as described above.

The metering region may also be described by its behavior. For example, the metering region may be static or dynamic. When the metering region is static, the region does not necessarily track particular objects within the image. For example, with live images, objects may move within the image and these may or may not remain within the metering region. For instance, if a coordinate system is used, the coordinates of the metering region may remain static despite movement of objects within the image. In contrast, when the metering region is dynamic, the metering region may track a particular object within the live image and the coordinates of the metering region may adjust accordingly.

The metering region may also be predefined. For example, a set of coordinates defining the metering region may be set prior to capturing an image. Accordingly, the metering region may be positioned in a particular region regardless of the characteristics of the captured image. As described above, the metering region may be based on an expected location of a face. Typically, the expected location of a face corresponds to a central portion of the image. This positioning may be further refined by additional factors. These factors may include characteristics derived from preferences, usage history, probability, etc. For example, a usage history may determine that a user typically places the face within a lower portion of the image and not precisely in a central portion. Accordingly, the selection of the metering region may be repositioned accordingly.

In implementations, the captured image may be displayed as a preview on a display 58 of the device 50. In these situations, a positioning guide may be used to direct a user to position their face within a certain region of a field of view of the camera 59. For example, a guide may be displayed on the previewed image and a user may alter the position of the device 50 and/or their face to position their face according to the guide. Accordingly, a metering region corresponding to the displayed guide may be used to adjust the image without actually detecting the face. In this instance, it is likely that a user cooperates and positions their face according to the guide. In some cases, the positioning guide may be dynamic and the metering region may dynamically track the positioning guide. The positioning guide may include a boundary, cross-hairs, one or more boundary edges, a shape (e.g. circle or rectangle), shading, or any other form of displaying a guide on the previewed image.

The metering region may also be based on receiving a user input that selects a portion of the captured image. The user input may include an input from an input device or a touch on a on touch sensitive display. For example, a user may touch the display 58 at a location corresponding to the location of a face within a captured image. The touch may be registered by the device 50 and a metering region may be selected based on the location of the touch. This may be an effective technique when performing facial recognition on an image including multiple faces in a live image or a stored image.

The metering region may also be based on characteristics of the image. As described, a face may not necessarily need to be detected to select a metering region. The metering region may be based on a contrast level, saturation level, color, and other image characteristics. For example, a face in front of a strongly lit background may have a low contrast level. The low contrast level may be identified as a probable location of a face, and accordingly, the metering region may be within this low contrast region. Similarly, a low saturation may be identified for a metering region. Other image characteristics may also be used to distinguish between regions or identify a region that may include a face. More than one metering region may be selected and they may overlap. The metering region may also be defined with a particular weighting of pixels within the image. For example, the weights of overlapping metering regions may be added. Unlike typical facial detection processes, it may not be necessary to show an outline or boundary region of the metering region on a previewed image. Instead, the metering region and adjustment may be done transparently to the user.

In step 25, the captured image may be adjusted based on characteristics of the metering region. The adjustment may adjust a live image in real-time or may adjust a picture that may be stored. For example, an adjustment to a live image may involve dynamically adjusting the captured image in response to real-time changes in the field of view of the camera 59. The adjusting may adjust capture settings of the camera 59, or may adjust the characteristics of a frame, or a stored image (e.g. snapshot) after a picture is taken. The metering region may typically correspond to at least a portion of a face within the image even when the face is not detected. Accordingly, the metering region may be optimized based on the characteristics of a portion of a face. The image adjustments may include optimizing one or more image settings. These settings may include exposure, gain, color balance (including white-balance), focus, contrast, (which may be expressed as a ratio or dynamic range), saturation, brightness, gamma, hue, sharpness, and the like. In should be noted that these settings may be adjusted in an image and would be readily understood by a person of ordinary skill in the art.

Typically, an exposure setting may be adjusted. An exposure setting may generally relate to camera exposure parameters, such as exposure time (e.g. shutter speed), gain, and/or f-number (e.g. relative aperture). By adjusting the exposure setting, an optimum brightness may be achieved for a face within the captured image. As described, the exposure may be optimized based on a metering region which may be a subset of the image. Conventional metering may be optimized for capturing the most visually appearing pictures, and therefore, are based on metering an entire image. Instead of metering an entire image, implementations may select the most relevant subset of the image for facial detection (e.g. at least a portion of a face). Accordingly, these adjustments may not produce the images most suitable for pictures as they may be optimized for facial detection. For example, the adjustment may adjust exposure to enhance contrast in a region of the image including a face (e.g. foreground), and as a result, it may oversaturate a background of the image to a point where objects in the background may not be visible. As mentioned above, other image settings may also be adjusted to optimize facial recognition.

Figure 6A:
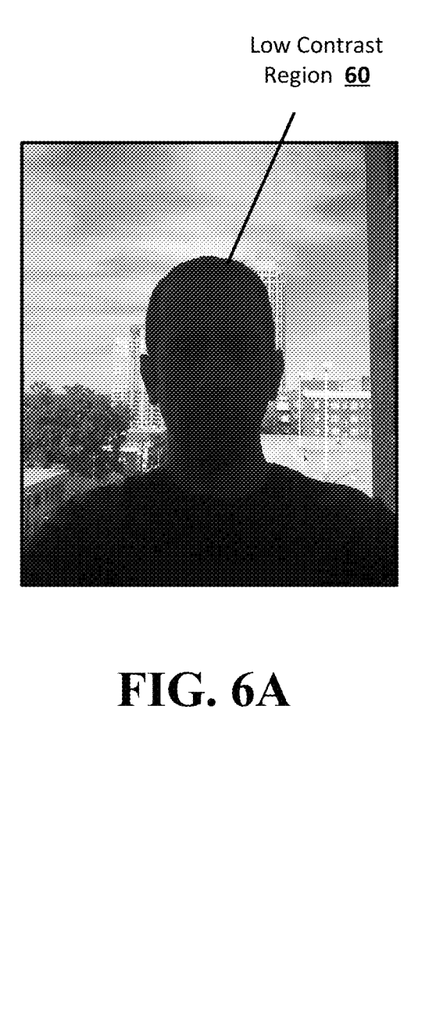
FIG. 6A shows an example of an underexposed face within an image as described in the disclosed subject matter.
Figures 6B, 6C:
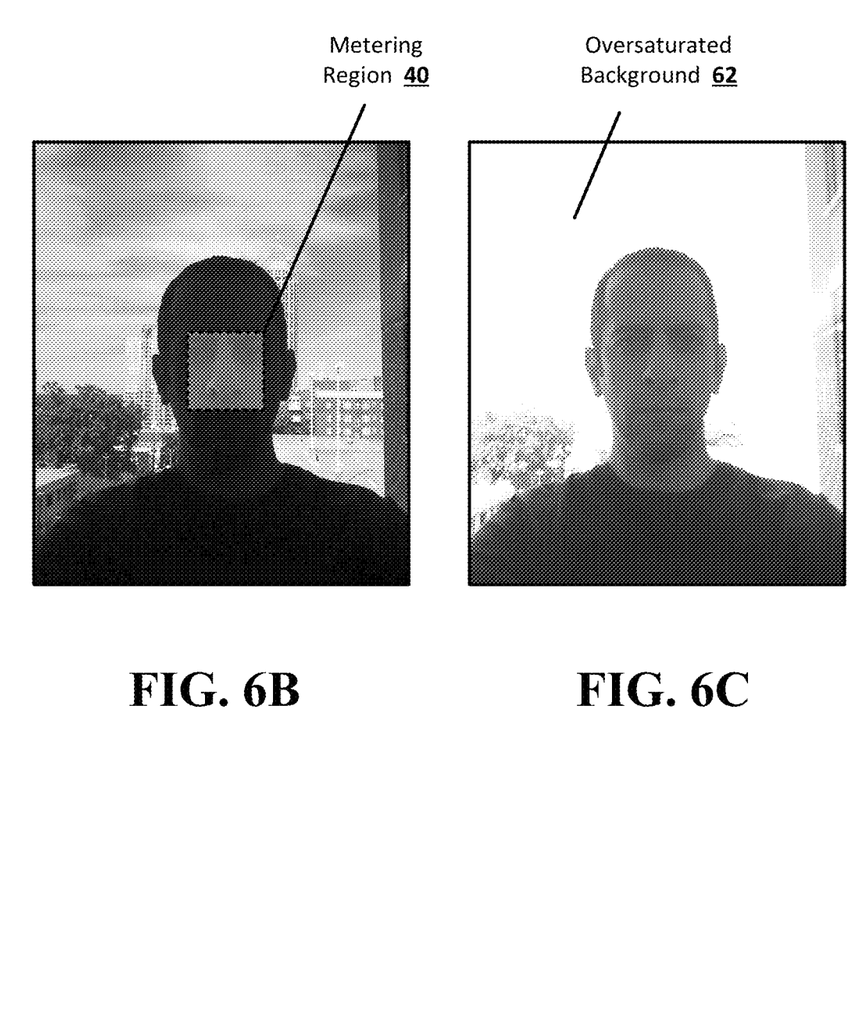
FIG. 6B shows an example of a metering region within the image shown in FIG. 6A according to an implementation of the disclosed subject matter.
FIG. 6C shows an example of an adjusted image based on the metering region shown in FIG. 6B according to an implementation of the disclosed subject matter.

FIGS. 6A-6C show an example of adjusting an exposure setting of an image based on a metering region within a portion of the image according to an implementation of the disclosed subject matter. FIG. 6A shows an example of an underexposed face within an image. This may occur, for example, when an image condition includes strong backlighting (e.g. when the subject has their back to a brightly lit window). An exposure setting, for example, may be based on an analysis of the entire image. Accordingly, when the image background is very bright this method may set the exposure to low levels such that the background is below a saturation level. As a result, as shown in FIG. 6A, the face may be within a low contrast region 60. In these situations, there is often insufficient contrast in the region of the face to perform detection. Accordingly, adjusting the image to such levels as shown in FIG. 6A may prevent detection of the face within the image.

FIG. 6B shows an example of a metering region within a portion of the image shown in FIG. 6A according to an implementation of the disclosed subject matter. A metering region 40 may be within a portion of the image and may correspond to an expected location of a face. For example, as shown, the metering region 40 may be a specified shape (e.g. rectangle) with dimensions equal to a certain percentage of the input image (e.g. a percentage of the image size) and placed at a specified location (e.g. center of the input image). The metering region 40 may be predefined and set prior to actually detecting a face.

FIG. 6C shows an example of an adjusted image based on the metering region 40 of FIG. 6B according to an implementation of the disclosed subject matter. The result of using the metering region 40 is that the image adjustment to exposure may be based on a portion of the face, and therefore, optimized for facial detection. As shown in this example, an image with strong backlighting may be optimized by adjusting the exposure setting resulting in oversaturating the background 62. As also shown, however, the contrast range in the area of the face may be improved, and accordingly, the image may be optimized for facial detection.

Returning to FIG. 2, in step 26, a face may be detected within the adjusted image. The facial detection method may include known methods for detection and be based one or more algorithms for identifying shapes, skin tone, color, facial texture data, and facial features within an image. As described above, a metering region may be selected prior to facial detection. In other implementations, a metering region may be selected after a facial detection algorithm is performed.

Figure 3:
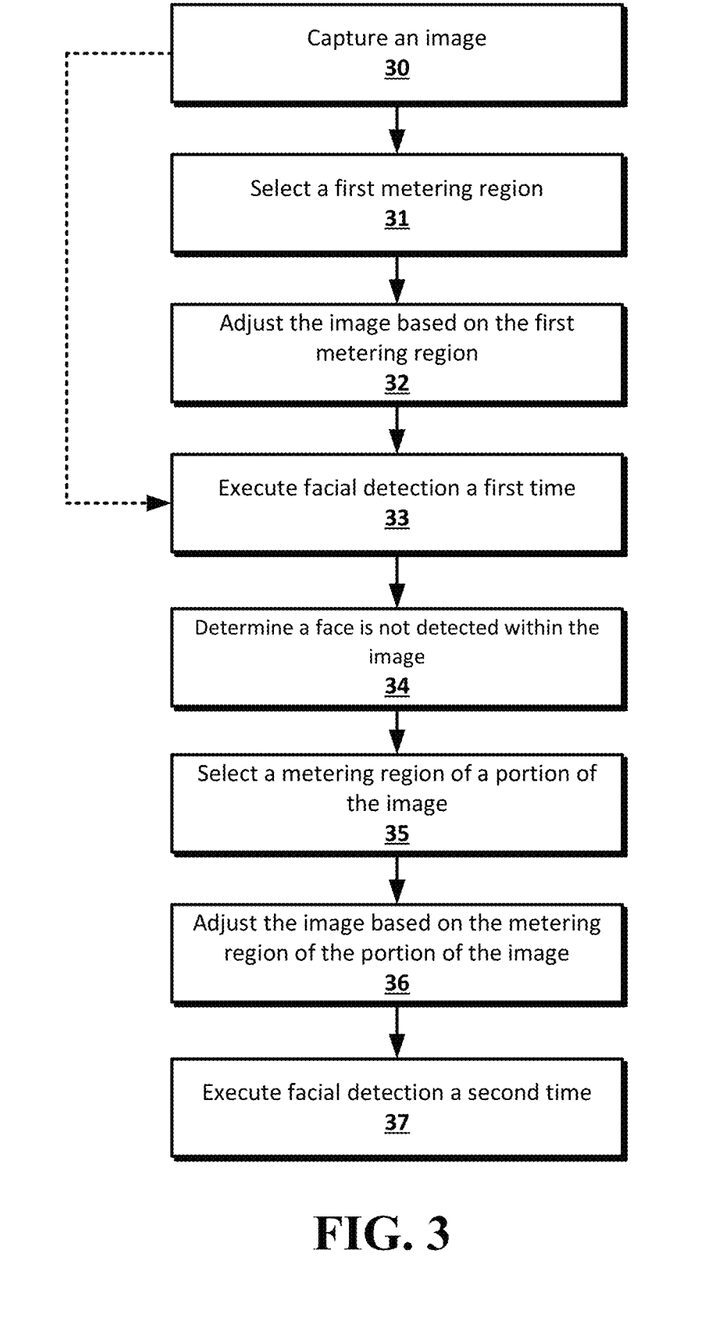
FIG. 3 shows a flow diagram of performing facial detection a first and second time according to an implementation of the disclosed subject matter.

FIG. 3 shows a flow diagram of performing facial detection a first and second time according to an implementation of the disclosed subject matter. In step 30, the device 50 may capture an image in a similar manner as described in step 22 of FIG. 2. In step 31, a first metering region may be selected. The first metering region may be based on an entirety of an image. For example, a standard or default auto exposure algorithm may be used, such as one that bases exposure parameters on a mean, median, or weighted value of the brightness of the entire image. In step 32, the image may be adjusted based on the first metering region. This adjustment may be based on providing the most visually pleasing images and may be a default setting, or a setting optimized for taking pictures.

In step 33, facial detection may be executed a first time. In implementations, the facial detection in step 33 may occur without adjusting the image in steps 31 and 32. In step 34, it may be determined that a face is not detected when executing facial detection the first time as the image adjustment (if performed in steps 31 and 32) may not have necessarily been optimized for facial detection. After it is determined that a face was not detected, a metering region may be selected in step 35 and the captured image may be adjusted in step 36 in a similar manner as described in steps 24 and 25 of FIG. 2 respectively. In particular, in steps 35 and 36, the image may be optimized for facial detection. In step 37, the facial detection algorithm may execute a second time and may detect a face within the image optimized for facial detection. As described above, the first metering region may be based on the entire image. The first metering region may also include a subset of the image. For example, a size of the first metering region may be larger than a size of the metering region within the portion of the image of step 35. Accordingly, in this scenario, the metering region in step 35 may be reduced to provide more precision for facial detection optimization.

In implementations, once facial detection is performed, the device 50 may perform facial recognition on the detected face. The recognition process may include comparing the detected face to a stored template. For example, features of the detected face template may be compared against the features of the stored reference template and a recognition confidence score may be determined. Upon a successful facial recognition (e.g. confidence score above a specified value), the device 50 may identify the face of the user. For example, upon the completion of facial recognition, a user's face may be authenticated and the device may be accessed or "unlocked" in response to the authentication request.

Implementations described herein may be included in an article of manufacture (e.g., one or more computer program products) having, for instance, computer usable media. The media has embodied therein, for instance, computer readable program code for providing and facilitating the capabilities described herein. The article of manufacture may be included as a part of a device or sold separately.

The flow diagrams described herein are just examples. There may be variations to these diagrams or the steps (or operations) described therein without departing from the implementations described. For instance, the steps may be performed in a differing order, or steps may be added, deleted or modified. Described herein, references to "one implementation," "an implementation," "an example implementation," etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, such feature, structure, or characteristic may be included in other implementations whether or not explicitly described.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, to thereby enable others skilled in the art to utilize those implementations as well as various implementations with various modifications as may be suited to the particular use contemplated.

The invention claimed is:

1. A method comprising:
receiving, by a computing device, an image viewed by a camera of the computing device;
receiving, by the computing device, an indication to perform facial detection;
determining, by the computing device and in response to the indication, a set of coordinates defining one or more regions of the image, wherein each region of the one or more regions corresponds to a location of a face in the image;
based on characteristics associated with the image, dynamically adjusting, by the computing device, the set of coordinates defining the one or more regions, thereby creating an adjusted image, wherein the dynamically adjusting of the set of coordinates comprises:
dynamically tracking a face positioning guide, wherein the face positioning guide dynamically positions the face within a region of a field of view of the camera, and
adjusting capture settings of the camera in response to real-time changes in the field of view of the camera; and
detecting, by the computing device, facial features associated with the one or more regions within the adjusted image.

2. The method of claim 1, further comprising displaying a preview of the image and wherein the preview includes the face positioning guide and the set of coordinates of the one or more regions is based on a location of the positioning guide.

3. The method of claim 1, further comprising displaying a preview of the image and receiving a user input selecting a portion of the previewed image and wherein the set of coordinates of the one or more regions is based on the received user input.

4. The method of claim 1, wherein the indication to perform facial recognition includes a request to authenticate a face of a user.

5. The method of claim 1, further comprising initially causing the camera to capture the image.

6. The method of claim 1, wherein the characteristics associated with the image include a contrast level, a saturation level, or a color of the image.

7. The method of claim 1, wherein the one or more regions of the adjusted image are smaller than the one or more regions in the image.

8. The method of claim 1, wherein the image is a live image, wherein the characteristics associated with the image include an object moving within the image, and wherein dynamically adjusting the set of coordinates defining the one or more regions comprises tracking the object moving within the image.

9. The method of claim 1, further comprising
comparing, by the computing device, the facial features to features in a stored reference template; and
determining, by the computing device and based on the comparison, a recognition confidence score.

10. The method of claim 9, wherein the stored reference template is stored on a second computing device separate from the computing device.

11. The method of claim 1, wherein the capture settings of the camera comprise at least one of: exposure, gain, color balance, focus, contrast, saturation, brightness, gamma, hue, or sharpness.

12. The method of claim 1, further comprising:
displaying the image as a preview on a display of the computing device; and
providing the face positioning guide to direct a user to position their face within a region of the field of view of the camera.

13. The method of claim 1, wherein the face positioning guide comprises one or more of a boundary, cross-hairs, one or more boundary edges, a geometrical shape, or a shading.

14. A method comprising:
receiving, by a computing device, an image viewed by a camera;
receiving, by the computing device, an indication to perform facial detection;
selecting, by the computing device, in response to the indication, a metering region within a portion of the image based on a predefined set of coordinates, wherein the portion of the image is less than an entirety of the image, and the metering region is selected prior to executing an algorithm for locating a position of a face within the image;
dynamically adjusting, by the computing device, the image based on the selected metering region, wherein the dynamically adjusting of the set of coordinates comprises:
dynamically tracking a face positioning guide, wherein the face positioning guide dynamically positions an expected location of the face within a region of a field of view of the camera, and
adjusting capture settings of the camera in response to real-time changes in the field of view of the camera; and
detecting, by the computing device, the face within the adjusted image.

15. The method of claim 14, wherein the image is a live image.

16. The method of claim 14, wherein the metering region is centered within the image.

17. The method of claim 14, wherein the predefined set of coordinates is determined prior to the receiving of the image.

18. The method of claim 14, wherein the metering region size is greater than or equal to 5% of the image size and less than or equal to 50% of the image size.

19. The method of claim 14, wherein the metering region includes at least two quadrants of the image.

20. A computing device, comprising:
a camera;
a processor; and
data storage, wherein the data storage has stored thereon computer-executable instructions that, when executed by the processor, cause the computing device to carry out functions comprising:
receiving, by the computing device, an image viewed by the camera;
receiving, by the computing device, an indication to perform facial detection;
selecting, by the computing device, in response to the indication, a metering region within a portion of the image based on a predefined set of coordinates, wherein the portion of the image is less than an entirety of the image, and the metering region is selected prior to executing an algorithm for locating a position of a face within the image;
dynamically adjusting, by the computing device, the image based on the selected metering region, wherein the dynamically adjusting of the set of coordinates comprises:
dynamically tracking a face positioning guide, wherein the face positioning guide dynamically positions an expected location of the face within a region of a field of view of the camera, and
adjusting capture settings of the camera in response to real-time changes in the field of view of the camera; and
detecting, by the computing device, the face within the adjusted image.

* * * * *